March 13, 1962  H. J. FRIEND ETAL  3,024,952
INSPECTION AND BUTTONING JIG
Filed March 9, 1960  5 Sheets-Sheet 1

INVENTORS
HARRY J. FRIEND
LUIS SOLER
BY
their ATTORNEY

March 13, 1962 H. J. FRIEND ETAL 3,024,952
INSPECTION AND BUTTONING JIG
Filed March 9, 1960 5 Sheets-Sheet 2
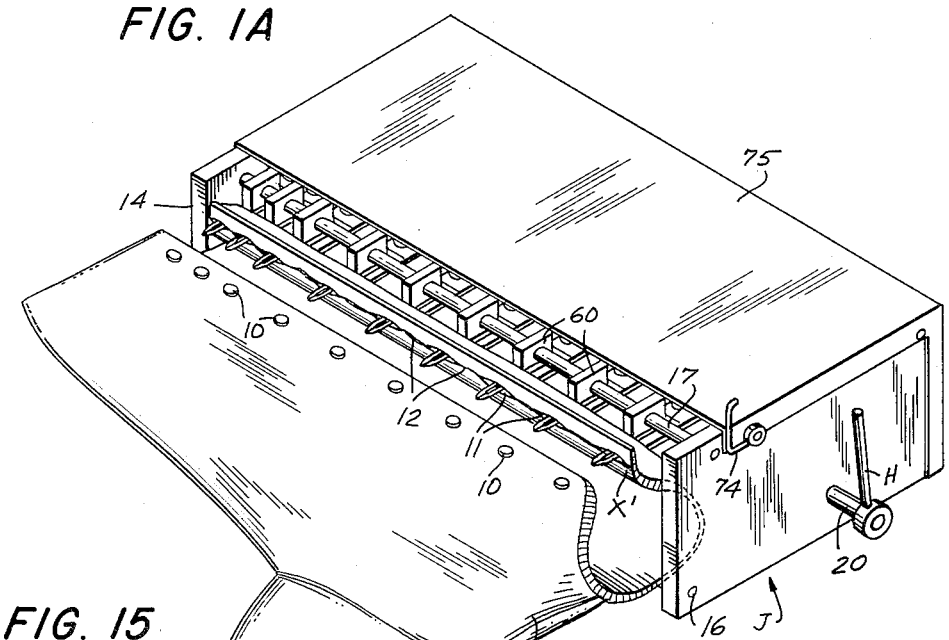
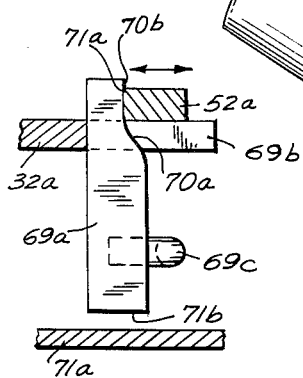
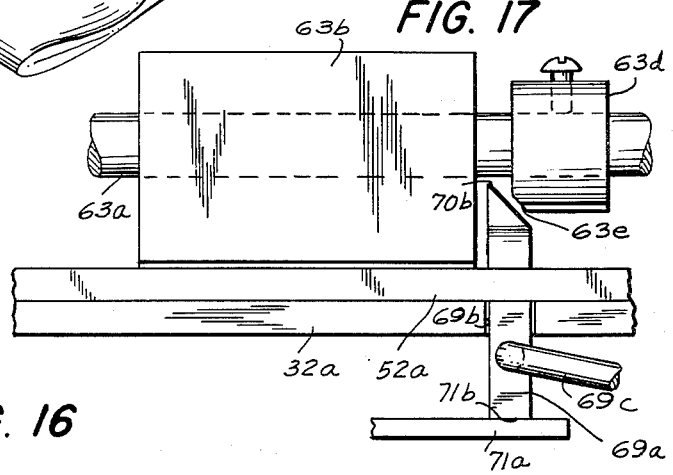
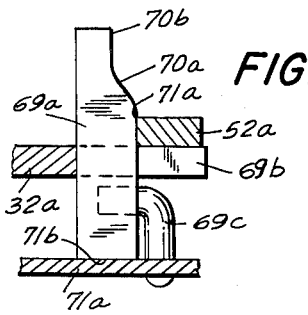
INVENTORS.
HARRY J. FRIEND
LUIS SOLER
BY
J. Basseches
their ATTORNEY

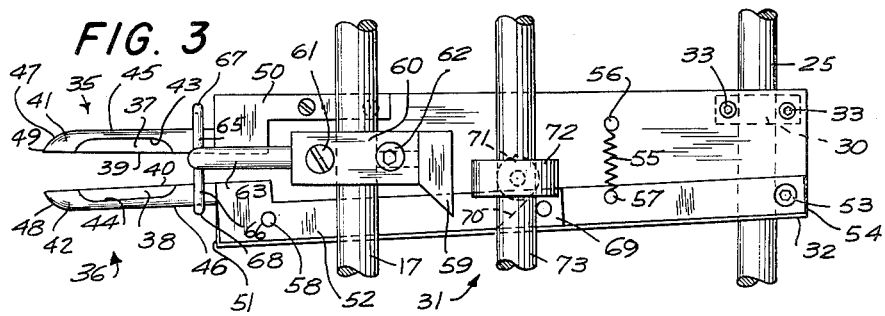
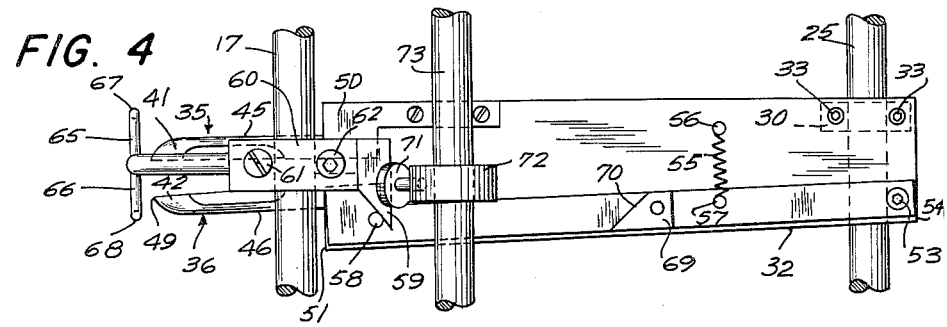
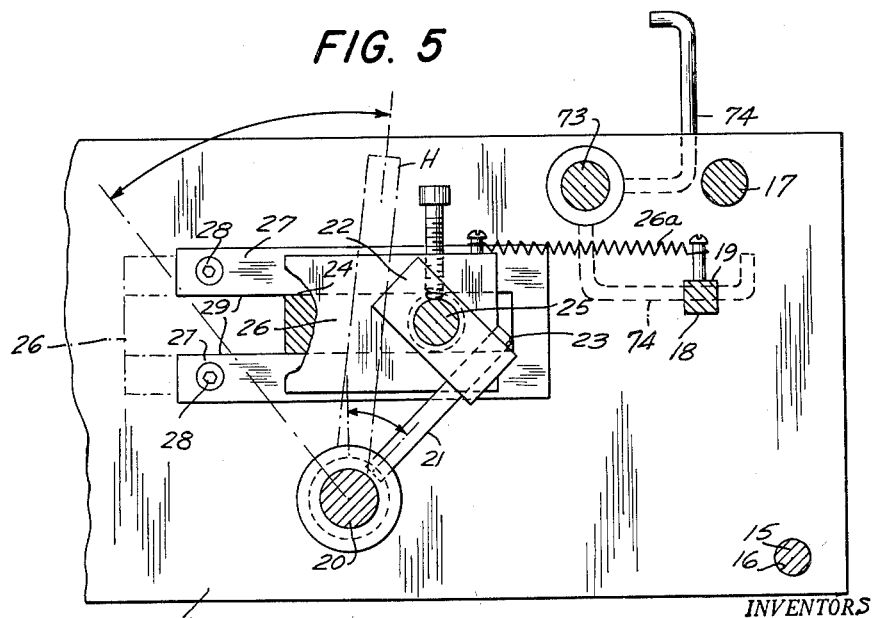

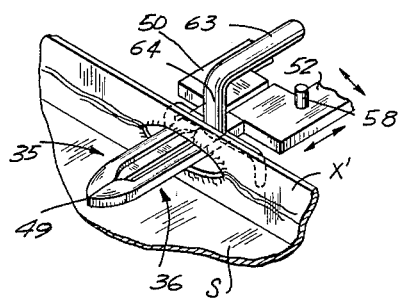
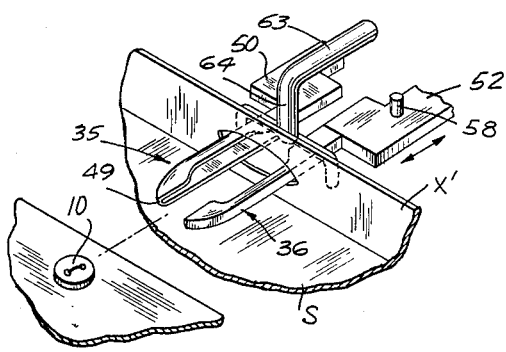
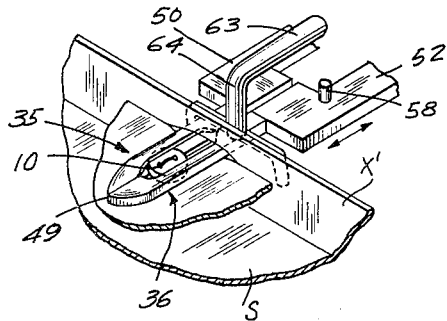
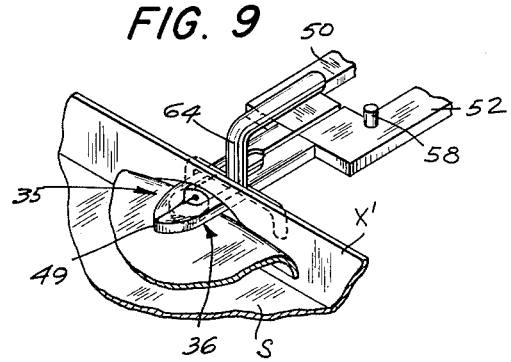
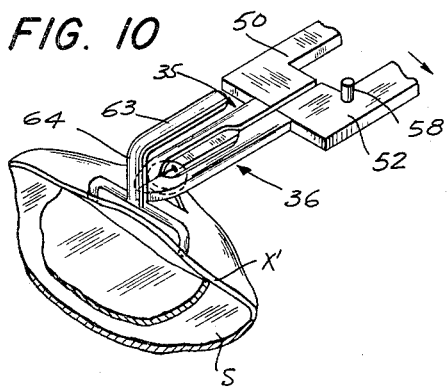
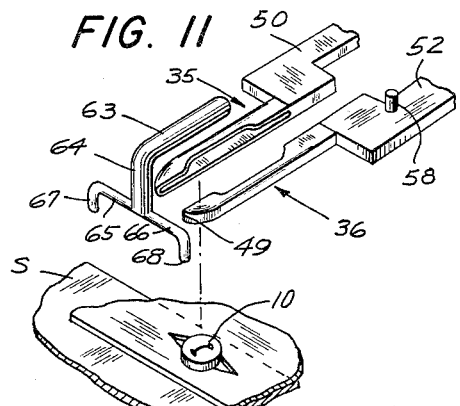

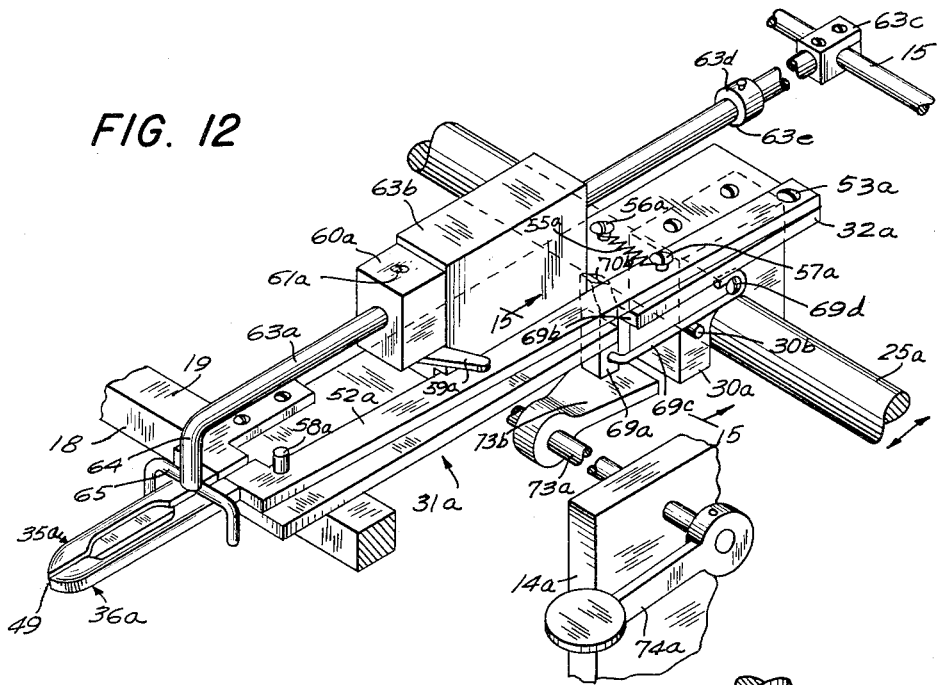
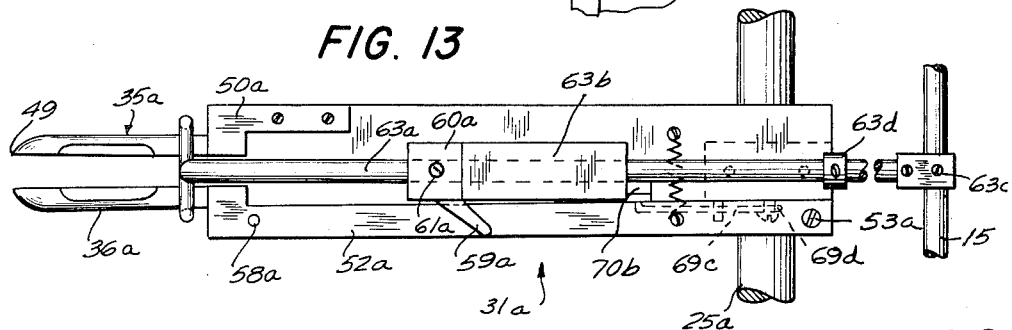
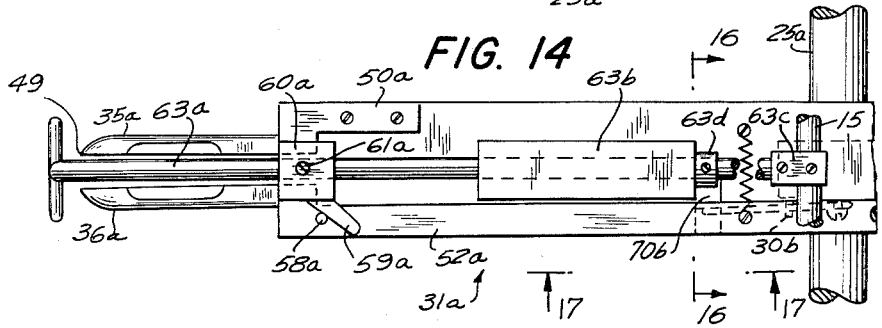

United States Patent Office 3,024,952
Patented Mar. 13, 1962

3,024,952
INSPECTION AND BUTTONING JIG
Harry J. Friend and Luis Soler, Miami, Fla., assignors to Emsig Machine Corporation, New York, N.Y., a corporation of New York
Filed Mar. 9, 1960, Ser. No. 13,856
11 Claims. (Cl. 223—1)

This invention relates to buttoning machines, and more particularly to buttoning and work holding jigs and still more particularly, this invention relates to buttoning jigs for soft goods for buttoning garments.

In the manufacture of garments of soft goods, such as shirts, sweaters, the practice is to carry out the sewing operations for applying the buttons and the completion of the buttonholes, the garment thereafter requiring trimming of the loose threads and then buttoning, before being pressed and packaged. The handling of soft goods thus entails both the tedious job of trimming the loose threads between the operations of making the buttonholes, and then buttoning the garment. The double handling for buttoning and trimming operations results in manual operations which are slow, tedious, time-consuming and costly, not to speak of inadequate finishing operations, which require inspection before the goods are released. Hand operations involving buttoning of freshly made buttonholes, particularly with relatively heavy plastic buttons, becomes tiring to the fingers, and as the operation of buttoning becomes multiplied during the course of the day, inefficiency due to great fatigue of the operator results.

Accordingly, it is an object of the invention to provide a work holding jig to facilitate work inspection and complete the garment assembly operation of buttoning at one time, whereby economies are effected and greater efficiency is achieved in the handling of garments at this stage of manufacture.

Still more particularly it is an object of the invention to provide a work holding jig for carrying out a buttoning operation whereby the entire garment is buttoned at one single operation, including its assembly upon a work holding jig for inspection of operations previously performed upon the garment, such as making of the buttonholes and applying of the buttons, trimming the same at this stage and then, without rehandling of the garment, simultaneously to button an entire garment, such as a shirt or sweater, thereby speeding up this operation without the likelihood of injuring the goods when carrying out this relatively arduous step in production.

In general, it is an object of the invention to provide a labor saving jig for carrying out inspection and buttoning operations, particularly useful in light garments, such as shirts, sweaters, blouses, whereby great economies are effected.

To attain these objects and such further objects as may appear herein or be hereinafter pointed out, reference is made to the accompanying drawings, forming part hereof, in which:

FIGURE 1A is a similar view at the second stage of operation for mounting the garment upon the jig;

FIGURE 3 is a fragmentary plan view of the buttoning element shown in FIGURE 2, at a different stage of operation;

FIGURE 4 is a view similar to the view shown in FIGURE 3 at still another stage of operation;

FIGURE 5 is a fragmentary sectional view on the line 5—5 of FIGURE 1;

FIGURES 6 to 11 are fragmentary perspective views of the buttoning element at the progressive stages of operation;

FIGURE 12 is a perspective view of another embodiment of the invention, to illustrate a buttoning component;

FIGURE 13 is a fragmentary plan view thereof;

FIGURE 14 is a plan view of the embodiment shown in FIGURE 12 at a still further stage of operation;

FIGURE 15 is a fragmentary sectional view on the line 15—15 of FIGURE 12;

FIGURE 16 is a fragmentary detail of the element shown in FIGURE 15 at a still further stage of operation.

FIGURE 17 is a fragmentary side elevation taken in the direction of lines 17—17 of FIGURE 14.

Figure 1:
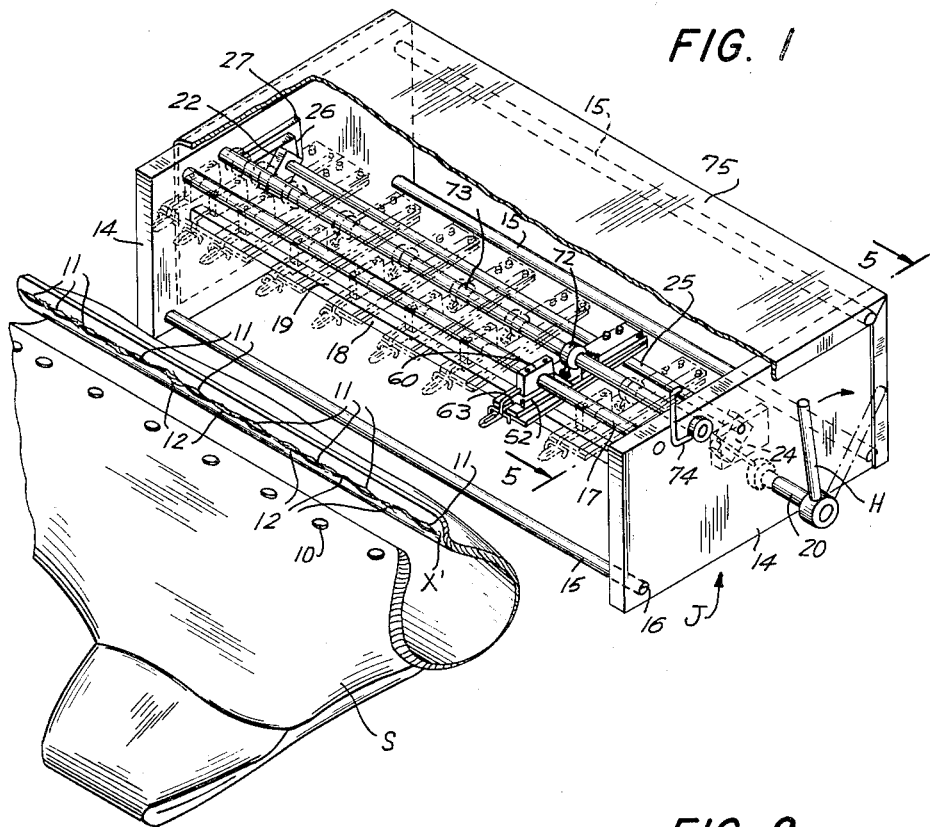
FIGURE 1 is a fragmentary perspective view showing a jig in accordance with the invention at an initial stage of use.

The invention contemplates the finishing operations in connection with a sweater S, illustrative of a soft garment which has just undergone the finishing operations of having the buttons 10 sewn thereto, with buttonholes 11 in corresponding position at each of the points on the fly, still if desired retaining the untrimmed threads 12 between the successive buttonholes. This leaves for the completion of the finishing operations as known in the trade, the operation of trimming of the threads 12 and the insertion of buttons 10 into the buttonholes 11. It is the objective of this invention to complete these other operations, or to confine the operation to that of buttoning.

The jig J has uprights or side plates 14 speed from each other and rigidly held in that spaced relation by brace rods 15 at approximately each corner of the side plates fitted into drill holes 16 to provide a generally rectangularly outlined casing, it being understood that an integral casing construction may be formed from the members. At an intermediate portion beneath the brace rods 17 there is positioned a support rod 18, preferably made of square stock material with a flat bearing surface 19 at its upper edge.

One of the plates 14 rotatably supports the crank shaft 20 which, on the outer face, is provided with an operating handle H. On the inner face of the plates 14, the crank shaft 20 is provided with a crank arm 21, coupled to the finger plate 22 at its free end 23, for sliding engagement therewith in the guide slot 24 as the crank arm 21 rotates about the shaft 20.

The finger plate 22 is symmetrically duplicated at the opposite end adjacent each plate 14 on the crank shaft and opposite finger plates 22 bodily carry the push rod shaft 25 therebetween. The opposite ends of the push rod 25 are supported in the slide plates 26, (see FIG. 5) mounted to slide between parallel, horizontally extended guides 27, 27, held to the plates 14 by suitable fastening elements 28. The guides 27 have bearing surfaces 29, cooperating with suitable studs extending from the slide plates 26, horizontally and slidably to mount the slide plates 26 supporting the push rod 25. The slide plates 26, at each end, are biased by the springs 26a anchored to the slides 27 and support 18, constantly to return the slide plates 26 forwardly unless moved counter-clockwise mechanically.

Figure 2:
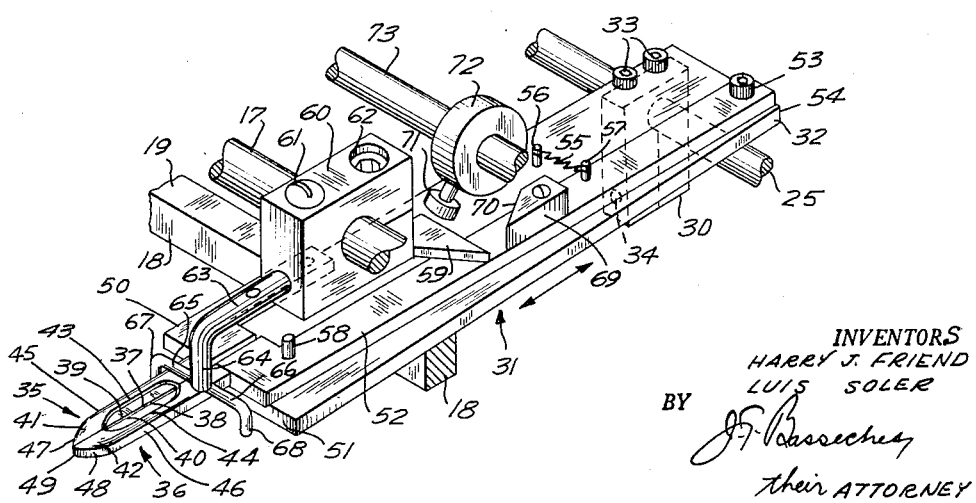
FIGURE 2 is an enlarged perspective view of an individual component.

The push rod 25 is arranged to have coupled to it, the clamp block 30 of one of a number of finger operating assemblies specifically shown in FIGURES 2, 3 and 4, the finger operating assemblies being generally designated 31, and constituting a lower slidable bed plate 32 whose rearmost end section is affixed by the screws 33 to the clamping block 30. The forward end of the finger operating assembly 31 rests upon the support rod 18, with provision for the plate 32 to slide longitudinally along the length of both the support rod 18 and the push rod 25 by a releasable set-screw 33 controlling the spaced jaws of the clamp block 30.

The finger operating assembly 31 is one of a plurality previously described, in accordance with the number of buttons to be buttoned. The finger assembly consists of a pair of forwardly directed, channelled button holding and seating fingers 35, 36, with lower branches 37, 38 of the channelled edges rectilinear and almost contacting each other at the bottom edges 39, 40. The upper branches 41, 42 are formed with button entering clearance cutouts 43, 44. The side or outer walls 45, 46 of the channels, forwardly thereof, at 47 and 48, are arcuately directed to provide together, at their meeting edges, a pointed section 49 when the fingers are in contact with each other, for buttonhole piercing or entering purposes, which will appear as this description proceeds.

The finger 35 is supported upon an arm 50, fixedly mounted upon the upper surface of the plate 32, to extend beyond the forward edge 51. The finger 36 is extended from the arm 52 which is pivoted at the rear end thereof 53 at the rear end of the plate 32 at 54. For convenience, arm 52 will be referred to as the operating arm. The operating arm 52 is normally spring biased in the direction of the arm 50 by the spring 55, anchored from the pins 56 and 57 on the plate 32 and operating arm 52, respectively. The effect of this biasing action of the spring 55 is normally to tend to hold the fingers 35 and 36 in contact with each other.

Extending from the upper surface of the operating arm 52 is a follower pin 58 which is carried slidingly transversely upon the supporting bar 18 in the path of the stationary cam 59, adjustably supported by the block 60 along the length of the stationary brace rod 17. Set screws 61, 62 are provided to release the block 60 and adjust this member with relation to the position which the finger operating assembly 31 may assume upon the adjustment of the clamp block 30 previously described.

Forwardly of the block 60, there extends the inverted L-shaped wiper 63, having a downwardly directed branch 64 from which keeper branches 65 and 66, respectively, extend, with fingers 67, 68 to either side of the button fingers 35, 36.

Also extending from the operating arm 52, on its upper surface at an intermediate point of the pivot and follower pin 58, is a cam block 69 whose cam surface 70 lies in the path of the eccentric roller 71, mounted upon the collar 72 on the rotatable crank shaft 73 which is trunnioned in the side plates 14 for rotation and is provided at one end or both ends with an operating crank arm 74.

The foregoing description completes the assembly except for the inclusion of a cover plate 75, which, in actual use, encases side plates 14, 14, through which cover, at its front, the fingers 35 protrude.

In use, the initial step is to extend the garment so that the fly portion X', having all of the buttonholes 11 as previously described, is arranged in parallelism with the rows of fingers 35, and 36, protruding from the assembly J. This is the position assumed in FIGURE 1.

When this has been accomplished by the operator, the next step is to set up the garment upon each one of the fingers so that one buttonhole 11 is pierced by or threaded over one set of fingers 35, 36, thereby assuming the initial position as in FIGURE 1A. In one form of operation, where the garment has not been trimmed, the garment then assumes a position shown in FIGURE 1A at which point the garment is stretched out for inspection of the connecting threads 12 and the loose threads may be more readily trimmed, in addition to the facility with which the garment is made readily available for inspection.

Where the garment has already been trimmed of loose threads, a sequence of steps for carrying out the buttoning operation is effected for the gang of finger assemblies, which includes that more specifically occurring for each of the finger assemblies that are shown in the fragmentary views of FIGURES 6 to 11.

In this form of construction, the button 10 sewn on the garment may be a sew-thru button, it being understood that self-shank buttons may be employed, as will be described herebelow with due adjustment to take care of gripping of this kind of button should the shank be excessively large.

Referring now specifically to FIGURES 6 to 11, after threading each buttonhole 11 upon a pair of the fingers 35, 36, the crank arm 74 is moved counterclockwise, as viewed in FIGURE 1. Rotation of the shaft 73 serves to engage the cam 70 by means of the roller 71 to space the operating arm 52 and thereby spread the fingers 35 and 36 from each other, limited only by the limiting and wiping fingers 67, 68. Only finger 68 is necessary for this limiting movement, as will be observed.

In this position, the button 10 may be brought within the channels of each of the fingers 35, 36 previously described, to seat the buttons, and at the same time a more intimate engagement of the garment with the fingers 35, 36 is effected, as the fingers spread into the buttonholes. Friction of the rollers 71 against the cams 70 reversably holds the fingers spread. Release of the crank 74 is now effected, so that the fingers 35, 36 are released into more intimate contact with the buttons, as shown in FIGURE 8, to occupy the minimum spread. This step may be likewise simultaneously effected by moving the crank arm H clockwise, as viewed in FIGURE 1, which in turn draws the push rod 25 rearwardly in relation to the stationary block 60 carrying the cam block 69 until the follower pin 58 has engaged the cam 59 to the limit of movement permitted by the downwardly dependent fingers 67, 68. In the course of this movement, the fly X' has engaged the wiper bar 65 while the button has been drawn through the buttonhole by the fingers 35, 36, as shown in FIGURE 10, followed by a simultaneous spreading of the fingers 35, 36 from each other by the relative movement of the operating arm 52 to the stationary arm 50. This series of operations assumes or reaches a stage of position of the fingers and garment as more clearly illustrated in FIGURE 11, whereupon the entire garment is released, to drop the same, fully buttoned, into a catch-all basket positioned below the jig J, to complete the buttoning operation.

In the foregoing installation, rather fragile garments, such as shirts and sweaters, may be quickly buttoned, particularly with heavy buttons having relatively high frictional characteristics, such as plastics, without marring the appearance of the buttonholes and without requiring too great an enlargement of the cutting of buttonholes to receive the buttons employed. Damage of the buttonholes is thereby avoided and cleanliness maintained in minimizing the possibility of soiling by reason of the fingering of the garments.

While we have shown and described fingers 35 and 36 channelled to seat the buttons on each side thereof of equal depth, particularly at the arcuate portions 47, 48 thereof, respectively, with the lower branches 39, 40 in contiguous relationship in one stage of movement (FIGURE 6), it is to be understood that these portions may be almost contacting for sew-thru buttons and preferably provided with button seats by being channelled so that the finger on the operating arm 52 is deeper than the finger on the relatively fixed arm 50. The off-center position of the thread under such circumstances, aids in unseating the button from the deeper button seat or channel and moves the finger in relation to the garment to facilitate release. Likewise, it will be observed in relation to shank or self-shank buttons, that the spacing of edges 39 and 40 toward each other will be resilient, to engage the shank of the sewn shank button and may require that clearance cutouts similar to cutouts 43, 44 be provided on the lower branches of the channelled portions of the fingers 35, 36.

It will be understood that while we have described and illustrated a preliminary distension of the garment first to mount the fly carrying the buttonholes upon each of the sets of fingers in the assembly, where trimming is practiced at a different station and is not of concern at this stage of operation, alternative means of carrying out the process may be employed. In this particular case, starting with the position in FIGURE 6, the operator may, with one hand, mount the buttonhole upon the fingers, as previously described, and with the other hand position the complementarily spaced button 10 upon the spaced fingers, in which event it will be understood that reliance will be placed merely upon the spring biasing of the fingers 35, 36 toward each other and first mounting the buttonhole upon the fingers while sequentially applying the complementary button upon the fingers 35, 36, and when the full series of buttonholes and buttons have been manually threaded and mounted, operating the operating handle H as before described, to release the entire garment from the suspended position by the single stroke of this handle member.

In the prior embodiment of our invention, reliance is placed upon the support and suspension of the finger operating assembly upon a pair of brace rods 15 and 17 adjustably to position the operating assemblies. This prior described embodiment also requires a two-thrust operation for adjusting the crank arm 74 and the camming means on the collar 72 operated by the actuating rod 73.

To facilitate adjustment quickly for a variety of button and buttonhole spacing and simplify certain phases of the operation of our device, we make reference to FIGURES 12 to 17.

In FIGURES 12 to 17 we have shown a simplification of finger operating assembly with regard to several of the adjustment features which may be required, particularly to reset the assembly in different spaced relation to different garments, or as to number of the finger assemblies as the garment buttons may be fewer or greater—for the fewer button members, to remove the interfering finger assemblies, and for the greater number, to add the same. In such construction too, replacement of finger assemblies may be desirable where a size and shape of the buttons may warrant a varying shape and spacing of the fingers of the finger assemblies.

For this latter purpose, a U-shaped clamping block 30a, with suitable set-screw attachment means, is arranged to be mounted on the push rod 25a. The latter is, for all purposes, identical with the push rod 25 and arranged to be slid by the operating linkage extending from the crank shaft 20 and slide plates 26 for the push rod 25 previously described, and by which operation of the crank arm 21 serves bodily to slide the slide plates 26 to carry the slide plates toward the front and rear slidably in relation to the push-off or wiper 63, the operation of which need not here be repeated.

The block 30a has its upper edge connected to the rear and bottom edge of the slide plate 32a, to slide the front edge on the support rod 18 on the flat surface 19, as in the first embodiment. However, even this form of support is optional and the support rod 18 may be omitted, as will presently appear.

Frontally, the finger assembly 31a, on its upper surface, is provided with a fixed finger 35a, extended from a fixed mounting arm 50a and an operating finger 36a, extended from an operating arm 52a, pivoted at the rear portion from the pivot 53a. A spring 55a affixed to the screws 56a and 57a on the plate 31a and arm 52a, respectively, biases the fingers 35a and 36a toward each other as in the prior embodiment. The arm 52a has a follower pin 58a extended to be moved into the path of the cam 59a on the block 69a, affixed adjustably by set-screw means 61a to the wiper rod 63a, whose forward portion has provision for a downward branch 64 and wiper 65 as in the prior embodiment.

The wiper support rod 63a extends slidably through a guide block 63b, affixed to the plate 31a, and extending to one side of the arm 52a. The wiper support rod 63a terminates in an adjustable clamp 63c, with suitable set-screws, slidably to affix the same along the brace rod 15 previously described, after first passing the rod 63a through a stop collar 63d which is provided with set-screw means to adjust the position along the rod 63a and with a camming edge 63e.

Guided tranversely of the plate 32a is a plunger cam 69a, slidably guided in a slot 69b and guided by the pin link 69c, pivotally mounted on the pivot 69d extending from the block 30a. The link and the gravitational load of the cam 69a is limited by the stop pin 30b.

In an upward direction transverse to the plate 32a, the cam 69a is guided along the rear wall of the block 63b in the path of the arm 52a and is pressed into engagement against it in its upward movement on a side cam 69a which contacts the side edge 71a, acting as a follower to pivot the arm 52a against the biasing influence of the spring 55a as it is moved upwardly.

The cam 69a is guided upwardly into the path of the collar 63d and where so extended is provided with a kick-off cam edge 70b faced (see FIGURES 12 and 17) toward the collar cam 63e, previously described.

With the finger operating assemblies 31a of the type illustrated in FIGURES 12 to 17, a rock shaft 73a is extended between the main side plates, such as 14a, to have the opposite ends trunnioned and project through the outer sides of the support plates, where a finger operable crank arm 74a is conveniently positioned for a right handed operator, to tilt the shaft 73a. Along the length of the rock shaft 73a, kick-off fingers 73b are keyed for slidable adjustment along the length of the rock shaft 73a to provide one finger 73b for each cam 69a, for engagement of the tail 71b thereof.

The fingers 73b may be wide enough so that a wide bearing surface is provided to accommodate its surface to different positions to which the corresponding finger assembly 31a operated by it may be set.

With finger assemblies as described and illustrated in FIGURES 12 to 17, quick accommodation is possible in adopting the jig to garments to be buttoned. As the garment may have a greater number of buttons to be buttoned, finger assemblies may quickly be added by spanning the clamping block 30a on the push rod 25a and adjusting the wiper support rod 63a so that the clamp 63c securely engages the brace rod 15. This quickly positions the plate 32a to slide on the support rod 19 and project the fingers 35a and 36a at the forward end of the jig, as previously described.

When one finger assembly 31a for each button and buttonhole of the garment has been positioned along the length of the support rods 18, and push rod 25a and brace 15 and a finger 73b underlie a cam 69a, the jig J is ready for use.

It is to be understood that a choice of one or a number of finger assemblies 31a to correspond to the number of buttons and buttonholes in the garment may be made for simultaneous operation, depending upon the capacity of the operator to use one hand or two hands efficiently.

With the adjustment made, the operation of each finger assembly is in accordance with the sequence previously described in connection with FIGURES 2 to 11, and more particularly FIGURES 6 to 11.

The normal position of the finger assembly 31a is to extend the push rod 25a forwardly to ride the plate 32a forwardly and project the fingers 35a and 36a through the casing, the rod 63a, being restrained by the anchoring connection of the brace rod 15 until the block 60a engages the guide block 63b, to block further forward movement of the finger assembly. In this position, the fingers 35a and 36a are in closest contact under the influence of the biasing spring 55a, which swings the arm 52a toward the stationary arm 50a.

In this position, the pointed end 49 of the fingers may have the buttonhole carrying position of the fly of the garment mounted thereon, the wiper bar 65 acting as rearward stop to slidable mounting of said fly as each buttonhole is threaded on said fingers. A tap of the operator's finger on the crank arm 74a rocks the shaft 73a to urge the cams 69a upwardly and engage the cam 70a against the arm 52a, to spread the fingers 36a in relation to the stationary fingers 35a. In this position, the button heads may be fitted into the finger channels. As each button is inserted between the fingers 35a and 36a and moved toward the points 49, the spring pressure of the spring 55a is relieved on the arm 52a, to release the frictional holds on the cam 69a, as will be apparent.

The next operation is to actuate the crank for retracting the push rod 25 (against a retaining spring force, as the spring 26a in the first embodiment) toward the rear of the casing carrying the various finger assemblies 31a rearwardly in relation to the stationary fly wiper support rod 63a. As the limit of rearward movement is approached by the finger assembly 31a, the wiper 65 pushes the fly X' carrying the buttonholes over the fingers 35a and 36a and draws the buttons 10 through the buttonholes. As the wiper passes the point 49, the follower pin 58a is brought into engagement with the cam 59a, to pivot the arm 52a about the pivot 53a and move to spread the finger 36a in relation to the finger 35a, where the weight of the garment disengages the buttoned work from the assemblies. At this stage of movement, finger assemblies 31a approach the block 63b to abut the collar 63d as the limiting point of movement. If gravity and the spring action of spring 26a have not restored the cam 69a from the projecting position initially effected in tripping the crank shaft 73a, the contact of the face 70b with the cam face 63e reestablishes the cam 69a to a position where it releases the arm 52a, to contact the same on the side edge 70b, the low position of the cam 69a, and permit the fingers 35a and 36a to assume the close contacting position shown in FIGURES 2 and 12, where the fingers together act as a buttonhole piercing assembly with greater facility. This closed position likewise serves to bring the fingers 35a and 36a into spring gripping position, to hold the button loaded against accidental dislodgment between one set of the fingers, while operation is effected in another of the set of fingers in a series of them on the jig.

By the jigs and finger assemblies which we have provided, the work of inspection, trimming and buttoning of garments, particularly soft goods such as sweaters, shirts and blouses, is greatly facilitated and this tedious portion of the work, normally manually conducted, is greatly accelerated.

Likewise, damage to the garment by reason of the use of the jigs, especially by inexperienced labor, is avoided, to the end that even handicapped labor may be employed gainfully, with confidence of accomplishing these concluding phases of the finishing operations successfully and with economy in time consumption heretofore not deemed possible for carrying out these operations.

While manual means are shown for operating the operating handle H and crank arm 74 in timed relation, it is understood that remote control powerized means or pedals may be incorporated to carry out the mechanical movement which may be required, without departing from the spirit of the invention.

Having thus described our invention and illustrated its use, what is claimed as new and is desired to be secured by Letters Patent is:

1. An inspection and buttoning jig for simultaneously buttoning an entire garment having a fly portion with a row of buttonholes and a corresponding row of buttons on the complementary section of the garment comprising a plurality of integrated and simultaneously operable finger assemblies, in number corresponding to the number of the buttons and buttonholes on the garment to be buttoned, each having a pair of buttonhole fingers with a piercing leading end from said pair upon which the buttonhole carrying fly is arranged manually to be mounted to hold said fly portion with the fingers pierced through said buttonholes, button enveloping seats on said fingers rearwardly of said leading end, and means to provide access to said seats on said fingers, button wiper means effective on said fingers acting as stops for mounting said fly upon said fingers and common means to actuate said plurality of fingers and wiper relatively to each other in unison, including cyclically effective means arranged first to spread said fingers gravitationally to release the garment and button upon drawing said buttons through the buttonholes.

2. A jig for inspecting, trimming and buttoning an entire garment having a fly portion with a row of buttonholes and a corresponding row of buttons on the complementary section of the garment comprising a plurality of finger assemblies which are integrated upon means to operate the assemblies as a single unit, each having at their leading ends a pair of buttonhole penetrating components, at least one of each pair being supported for removably carrying a portion of the buttonhole fly of the garment by extending through the buttonholes thereof, and having a button seat rearwardly of said buttonhole penetrating component, the other of said pairs of components providing button enveloping means to shield and hold said button on said seat removably against displacement.

3. A jig for inspecting, trimming and buttoning an entire garment having a fly portion with a row of buttonholes and a corresponding row of buttons on the complementary section of the garment comprising a plurality of finger assemblies, each being independently adjustable spacially relatively to each other and having means to integrate the same to operate as a single unit, each having at their leading ends a pair of buttonhole penetrating components, at least one of each pair being supported for removably carrying a portion of the buttonhole fly of the garment by extending through the buttonholes thereof, and having a button seat rearwardly of said buttonhole penetrating component, the other of said pairs of components providing button enveloping means to shield and hold said button on said seat removably against displacement, and fly wiper means guided relatively to said pair of buttonhole penetrating components to thread a button held by said seat through said buttonhole.

4. A jig for buttoning a garment having a sewn button and buttonhole fly, the components of the fly having a row of complementarily positioned buttons and buttonholes, respectively, the combination comprising a plurality of finger assemblies independently adjustable relatively to each other and integrated to operate as a single unit, the leading ends of which, each having a pair of buttonhole penetrating point providing components, at least one of which includes a button seat rearwardly of the leading ends of said components and comprising a channel within which the button may be shieldingly held, the other of said pair of components comprising means to hold said button in said channel on said seat removable against displacement and a relatively slidable fly wiper including means for moving said fly wiper and pair of components relatively to each other, whereby upon retraction of said components holding a button through a buttonhole, the fly is buttoned upon release of said button, one of said relatively movable components including actuating means arranged to move said components relatively to each other and release a button held by said components on said seat.

5. A jig for inspecting, trimming and buttoning garments having a button and buttonhole fly, the components of the fly having a row of complementarily positioned buttons and buttonholes, respectively, the combination comprising a plurality of finger assemblies independently adjustable relatively to each other and integrated to operate as a single unit, the leading ends of each assembly comprising a pair of buttonhole penetrating components, at least one of which has a button seat rearwardly of the ends and the other including means to hold said button on said seat, a fly wiper, means for moving said fly wiper and components relatively to each other, means to actuate one of the pair of said components initially to permit button seating and means for moving said components relatively to said fly wiper to draw a button through said buttonhole, including means for releasably moving said components relatively to each other and disengage said button from said seat upon drawing of a button through said buttonhole.

6. In a jig for buttoning a garment having a fly portion with a row of buttonholes on one component thereof and a corresponding row of buttons on the complementary section of the garment comprising, in combination a gang of an integrated group of single finger assemblies, supporting means for moving the same in unison and adjustable relatively to each other on said supporting means in accordance with the spacing of buttons on said garment, each finger assembly comprising a pair of buttonhole penetrating components including complementary channels terminating in a buttonhole penetrating point, said channels cooperating to form a button seat and including means providing access to said seat, and together shielding a button so seated for threading through a buttonhole, a fly wiper and means for moving said components and fly wiper relatively to each other and along the same to strip a fly mounted on said finger assembly from the same after buttoning the fly.

7. A jig for inspecting and buttoning a garment having a fly portion with a row of buttonholes on one component thereof and a corresponding row of buttons on the complementary section of the garment comprising, in combination, a gang of an integrated group of single finger assemblies independently adjustable relative to each other and integrated to operate as a single unit, each comprising a pair of buttonhole penetrating components, each assembly including button seating channels cooperating to provide a button seat, a fly wiper, means for moving said channels and fly wiper relatively to each other, means for moving said assemblies in spaced relation to each other to conform said space of said assemblies to the spacing of the button and buttonholes of said garment and means for moving said channels and wiper relative to each other in unison.

8. In a garment buttoning jig for a garment having a fly portion with a row of buttonholes on one component thereof and a corresponding row of buttons on the other component thereof, a finger assembly including a pair of buttonhole penetrating components, one of which has a piercing leading end, and comprising a pair of button seating channels rearwardly of said end, one of which is supported for spreading movement relative to the other for receiving a button therebetween and provide a button seat between said channels which, in close contact to each other, envelope a button held therebetween, a fly wiper spanning said channels, means for guiding said fly wiper and channels relatively to each other from a point rearwardly of said seat to the free end of the buttonhole components, said channels being supported on means including camming means cyclically to move said fly wiper in a position toward said penetrating point and sequentially move said channels in spaced position from each other to release a button seated between said channels, and means to return said channels to button hole penetrating contacting position, and means to space said channels from each other to permit seating of a button between said channels.

9. In a garment buttoning jig for a garment having a fly portion with a row of buttonholes on one component thereof and a corresponding row of buttons on the other component thereof, a finger assembly comprising, in combination, a pair of buttonhole penetrating components, one of which components has a piercing leading end, and including button holding fingers rearwardly providing between them a button seat to hold a button, a fly wiper spanning said fingers and slidably mounted relatively thereto and means for moving said fly wiper and fingers longitudinally of each other, one of said fingers being mounted on an operating arm, the other of said fingers being stationary, a support for said fingers, a support for said fly wiper and means for moving each of said supports relatively to each other whereby to guide said finger and wiper along each other and cooperating cam means on said support means for said fly wiper and operating arm, respectively, cyclically to space said fingers from each other and release a button held therebetween to move past said buttonhole penetrating end of said fingers, and including means to return said fingers to buttonhole penetrating position.

10. In a garment buttoning jig for a garment having a fly portion with a row of buttonholes on one component thereof and a corresponding row of buttons on the other component thereof, a finger assembly comprising, in combination, a pair of buttonhole penetrating components complementarily formed into a buttonhole piercing end including button holding fingers forming between them a button seat rearwardly of said end to hold a button, a fly wiper spanning said fingers and means for moving said fly wiper and fingers longitudinally of each other, one of said fingers being mounted on an operating arm, the other of said fingers being stationary, a support for said fingers, a support for said fly wiper and means for moving each of said supports relatively to each other whereby to guide said first finger and wiper along each other and cooperating cam means on said support means for said fly wiper and operating arm, respectively, cyclically to space said fingers from each other and release a button held therebetween to move past said button penetrating end of said fingers, and including means to return said fingers to buttonhole penetrating position, and means to space said fingers from each other to provide access by a button to said button seat.

11. In a garment buttoning jig for a garment having a fly portion with a row of buttonholes on one component thereof and a corresponding row of buttons on the other component thereof, a finger assembly comprising, in combination, a pair of buttonhole penetrating components complementarily formed into a buttonhole piercing end including button holding fingers forming between them a button seat rearwardly of said end to hold a button, a fly wiper spanning said fingers and means for moving said fly wiper and fingers longitudinally of each other, one of said fingers being mounted on an operating arm, the other of said fingers being stationary, a support for said fingers, a support for said fly wiper and means for moving each of said supports relatively to each other whereby to guide said first finger and wiper along each other and cooperating cam means on said support means for said fly wiper and operating arm, respectively, cyclically to space said fingers from each other and release a button held therebetween to move past said button penetrating end of said fingers, and including means to return said fingers to buttonhole penetrating position, and means to space said fingers from each other to provide access thereto by a button to said button seat, and including manually operable means to release said fingers to button engaging position.

References Cited in the file of this patent

UNITED STATES PATENTS

| | | |
|---|---|---|
| 1,207,729 | Enslin | Dec. 12, 1916 |
| 1,207,731 | Farnum | Dec. 12, 1916 |
| 1,273,442 | Bazzoni | July 23, 1918 |
| 1,273,444 | Enslin | July 23, 1918 |